Patented Aug. 14, 1934

1,970,090

UNITED STATES PATENT OFFICE 1,970,090

FLOOR COVERING OR LIKE MATERIAL

Arthur Clement Hetherington, Ardrossan, and Stuart Anderson Sim, Saltcoats, Scotland, assignors to Imperial Chemical Industries Limited, a corporation of Great Britain No Drawing. Application July 1, 1932, Serial No. 620,530. In Great Britain July 8, 1931

6 Claims. (Cl. 106—40)

The present invention relates to the production of plastic masses which contain benzyl cellulose and which are suitable for application as floor coverings or the like.

It has already been proposed to employ benzyl cellulose in the production of plastic compositions generally. More particularly it has been proposed to manufacture coverings for floors, walls and the like from benzyl cellulose gelatinized by means of tri-cresyl phosphate, with fillers and colouring substances and with or without oxidized drying oils in the form of linoxyn or the like.

In the manufacture of plastic masses adapted for floor coverings or the like, it is of the greatest importance that the plastic material in sheet form should be highly flexible, i. e. capable of being doubled over so as to assume a relatively high curvature without the development of cracks. We have made experiments and have found that the flexibility of a plastic mass containing benzyl cellulose depends not only on the relative proportions of benzyl cellulose, plasticizer, fillers, colours and other adjuvants, but also to a marked degree on the nature of the plasticizer. Thus we have found that the flexibility of a benzyl cellulose plastic is materially improved if in place of such common plasticizers as tricresyl phosphate, there are used neutral aromatic ethers of a polyhydric alcohol such as glycerol, for example glycerol dicresyl ether (also known as dicresylin). By neutral aromatic ethers are meant aromatic ethers not containing in the aromatic portion any reactive groups such as amino-, carboxy- or hydroxy-groups.

The present invention consists accordingly in compositions adapted for use as floor coverings and comprising homogeneous mixtures of benzyl cellulose, neutral aromatic ethers of polyhydric alcohols, and vegetable fillers.

The invention also includes compositions comprising one or more of the said aromatic ethers, for example dicresylin, one or more vegetable fillers such as cork dust, sawdust or the like, and with or without other adjuvants such as pigments.

Preferably we use a benzyl cellulose which has a viscosity of about 3 to 5 c. g. s. units in a 10% solution in a mixture of 80 parts by weight of toluol and 20 parts by weight of industrial spirit.

Preferably also we employ as a constituent of the plastic, a resin, for example ester gum, the admixture of which not only improves the flexibility of the final floor covering but also improves the working of the plastic during its manufacture.

In carrying the invention into effect the benzyl cellulose (dry or water wet) may be incorporated in a machine of the Werner-Pfleiderer type with the requisite amount of the aromatic ether of a polyhydric alcohol, preferably at a temperature of 50–90° C. No volatile solvent need be used, and the resin may be added along with the benzyl cellulose and plasticizer, or subsequently. Minor proportions of other plasticizers and softeners may be used in addition to the aromatic ether of a polyhydric alcohol. In this connection, chlorinated aromatic substances such as polychlornaphthalenes and chlorinated diphenyls are particularly useful, partly on account of their compatibility with the composition containing the aromatic ethers of polyhydric alcohols and their fire retarding properties.

After the ingredients of the unfilled plastic have been incorporated for a time sufficient to render the mass completely homogeneous, the plastic material is converted into finished floor covering material by rolling or otherwise suitably incorporating it with a vegetable filler such as cork dust, sawdust or the like, with or without yellow ochre, and/or other pigments, fillers, and adjuvants as commonly employed in the art.

The incorporation of the benzyl cellulose with the plasticizer and with the gum, if such is present, may also suitably be carried out by milling the ingredients together on heated rolls.

The following example illustrates how the invention may be carried into effect. The parts are by weight.

Example 1

35 parts of benzyl cellulose (viscosity 3 c. g. s. units in 10% solution in 80:20 toluol-industrial spirit mixture) and 65 parts of dicresylin are incorporated together in a Werner-Pfleiderer or other suitable incorporating machine, and when homogeneous the plastic mass is incorporated with cork dust, and with yellow ochre or other suitable inert filler, and formed into a flat sheet. In the preparation of the final plastic good results are obtained by incorporating 60 parts of filler with 40 parts of the initial plastic.

In this example 15 parts of ester gum may be substituted for the same number of parts of dicresylin, an improved product being obtained.

Example 2

35 parts benzyl cellulose (viscosity as as in Example 1), 35 parts dicresylin, 15 parts polychlornaphthalene with a chlorine content of 52.5%, and 15 parts of ester gum are incorporated together in a Werner-Pfleiderer or other suitable incorporating machine. When homogeneous the plastic mass is incorporated with cork dust, and with yellow ochre, or other suitable inert fillers and formed into a flat sheet as in Example 1. The material may be used as a floor covering. As a modification of the process the filled plastic mass may be attached by hot rolling to a burlap backing, thus forming a linoleum-like material.

The invention is not limited to the proportions of ingredients shown in the examples, as variations may be made according to the desired final properties of the material.

Among the advantages of the invention may be mentioned, in addition to the high flexibility of the products, their relative non-inflammability and resistance to dilute aqueous alkali, this last property being important in relation to floor coverings because of the frequent washing to which they may be exposed.

As many apparently widely different embodiments of this invention may be made without departing from the spirit and scope thereof, it is to be understood that we do not limit ourselves to the specific embodiments thereof except as defined in the appended claims.

We claim:—

1. A composition adapted for use as a floor covering and comprising a homogeneous mixture of benzyl cellulose, a neutral aromatic ether of a polyhydric alcohol, and a vegetable filler, said filler constituting about 60% of the total composition.

2. The composition of claim 1, in which the benzyl cellulose is selected to have a viscosity of 3–5 c. g. s. units in a 10 per cent. solution in a mixture of 80 parts by weight of toluol and 20 parts by weight of industrial spirit.

3. A composition adapted for use as a floor covering and comprising a homogeneous mixture of benzyl cellulose, a neutral aromatic ether of a polyhydric alcohol, a resin, and a vegetable filler, said filler constituting about 60% of the total composition.

4. A composition adapted for use as a floor covering and comprising a homogeneous mixture of benzyl cellulose, a neutral aromatic ether of glycerol, and a vegetable filler, said filler constituting about 60% of the total composition.

5. A composition adapted for use as a floor covering and comprising a homogeneous mixture of benzyl cellulose, dicresylin and a vegetable filler, said filler constituting about 60% of the total composition.

6. A composition adapted for use as a floor covering and comprising a homogeneous mixture of benzyl cellulose, dicresylin, ester gum, and a vegetable filler, said filler constituting about 60% of the total composition.

ARTHUR CLEMENT HETHERINGTON.
STUART ANDERSON SIM.